T. H. MONTAGUE.
DENTAL ARTICULATOR.
APPLICATION FILED AUG. 8, 1912.
1,045,586.
Patented Nov. 26, 1912.
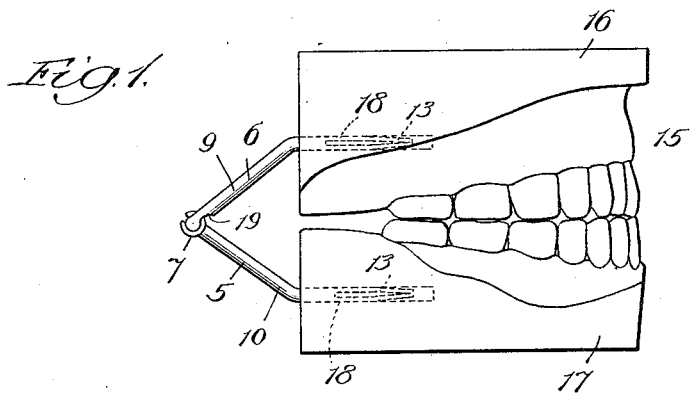
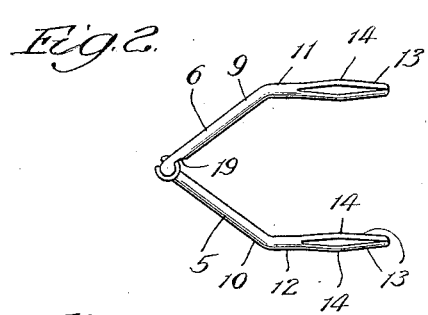
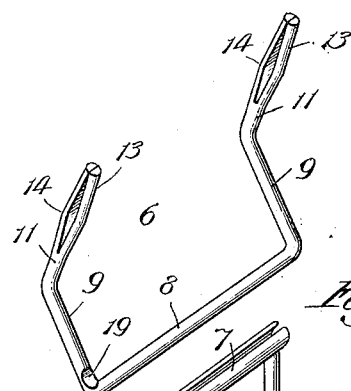
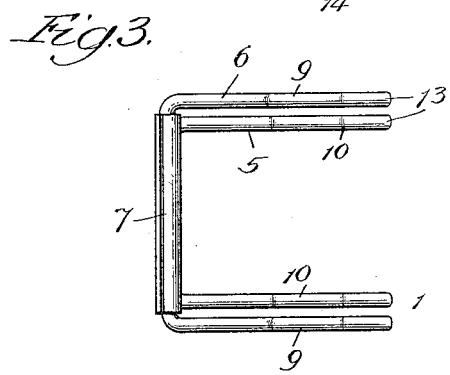
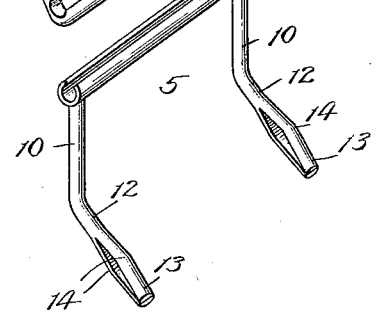
Witnesses:
Inventor:
Theodore H. Montague,

UNITED STATES PATENT OFFICE.

THEODORE H. MONTAGUE, OF BLUE ISLAND, ILLINOIS.

DENTAL ARTICULATOR.

1,045,586.  Specification of Letters Patent.  Patented Nov. 26, 1912.

Application filed August 8, 1912. Serial No. 714,014.

*To all whom it may concern:*

Be it known that I, THEODORE H. MONTAGUE, a citizen of the United States, residing at Blue Island, in the county of Cook and State of Illinois, have invented a new and useful Improvement in Dental Articulators, of which the following is a specification.

My improved articulator was devised, more particularly, for use in uniting the superior and inferior maxillaries of orthodonthia models, and I have, therefore, illustrated it in this connection in the accompanying drawings, though I do not wish to be understood as intending to limit it to this particular use; my object being to provide a simple, economical and improved construction of articulator of the separable-hinge type.

Referring to the accompanying drawing, Figure 1 is a view in side elevation of an orthodonthia model, the members of which, shown in closed condition, are connected together by an articulator constructed in accordance with my invention. Fig. 2 is a similar view of the articulator, the members thereof being shown in the position represented in Fig. 1. Fig. 3 is a plan view of the articulator in the position illustrated in Fig. 2; and Fig. 4, a perspective view of the members of the articulator in disassembled, but related, condition, this view showing the relative positions of said members for telescoping one with the other to unite them, or for disconnecting them one from the other as desired.

My improved articulator comprises two hingedly-connected U-shaped members 5 and 6, the member 5 being of less length than the member 6 and formed with a longitudinally slit-sleeve section 7 surrounding the bar-portion 8 of the member 6 and forming therewith the hinge connection between said members when they are telescoped with each other into the condition represented in Fig. 3, as hereinafter described.

The arms 9 and 10 of the members 5 and 6, respectively, are deflected as represented at 11 and 12 and at their extremities are split, the split portions 13 thus formed being bent apart between their ends as represented at 14 to thus cause the arms 9 and 10 to present yielding and enlarged ends. In assembling the articulator with the members of a model, as for example that illustrated at 15 and formed of the members 16 and 17, holes represented at 18 are first drilled in said members and the ends of the articulator members thereupon inserted into these holes, the latter being preferably of a diameter slightly greater than the diameter of the unsplit portions of the arms 9 and 10, whereby the split portions 13 will contract, upon entering the holes 15 and thus serve to securely hold the parts of the articulator to the members of the model by frictionally engaging with the walls of the holes 15.

It is desirable in manipulating the model that the members thereof be disconnected and united at will, and to permit this to be accomplished without disengaging the articulator sections from the members of the model with which they are respectively connected, I provide the slit-sleeve section 7 hereinbefore referred to, and form a notch 19 in one of the arms 9 adjacent to the bar 8, which permits the members of the articulator to be disconnected by moving them lengthwise of each other when the members of the model are swung apart sufficiently far to cause the slit portion of the sleeve 7 to register with the notch 19, it being understood that the members of the articulator may be assembled by telescoping the sleeve 7 with the bar 8 by slipping the sleeve at its slit end over the notched-portion of the bar 8.

It will be understood from the foregoing that by constructing an articulator in accordance with my invention, the members of the model may be opened and closed at will by swinging them on the hinge connection provided, without danger of accidental separation of the members of the articulator, and that, when desired, the members of the articulator may be quickly disconnected for separating the model members.

What I claim as new and desire to secure by Letters Patent is—

1. A dental articulator formed of a pair of U-shaped members, one of which is formed with a sleeve section slit longitudinally and arms secured to and extending at angles to said sleeve, said sleeve being adapted to telescope with the bar-portion of the other of said members and form therewith a hinge, for the purpose set forth.

2. A dental articulator formed of a pair of hingedly-connected members having enlarged contractible end-portions, for the purpose set forth.

3. A dental articulator formed of a pair of hingedly-connected members having split ends with the split-portions bent apart to cause the ends of said members to be enlarged and yieldable for the purpose set forth.

THEODORE H. MONTAGUE.

Witnesses:
HERMAN SEYFORTH,
HARRY NORDEN.

Copies of this patent may be obtained for five cents each, by addressing the "Commissioner of Patents, Washington, D. C."